United States Patent
Wang et al.

(10) Patent No.: US 11,637,637 B1
(45) Date of Patent: Apr. 25, 2023

(54) HYBRID COMPENSATION OF CHROMATIC DISPERSION IN OPTICAL NETWORKS

(71) Applicant: Equinix, Inc., Redwood City, CA (US)

(72) Inventors: Qiang Wang, San Carlos, CA (US); Balakrishnan Sridhar, Ellicott City, MD (US); Iwan Kartawira, San Jose, CA (US); Manveer Singh, Tracy, CA (US); Mohan Rao G. Lingampalli, San Jose, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

(21) Appl. No.: 17/645,883

(22) Filed: Dec. 23, 2021

(51) Int. Cl.
*H04B 10/61* (2013.01)

(52) U.S. Cl.
CPC ............. *H04B 10/6161* (2013.01); *H04B 2210/252* (2013.01)

(58) Field of Classification Search
CPC ............. H04B 10/50–588; H04B 10/6161
See application file for complete search history.

(56) References Cited

U.S. PATENT DOCUMENTS

| | | | |
|---|---|---|---|
| 8,606,108 B2 | 12/2013 | Sridhar | |
| 2002/0003646 A1* | 1/2002 | Ishikawa | H04B 10/2519 398/147 |
| 2008/0199191 A1* | 8/2008 | Essiambre | H04L 25/03057 398/208 |
| 2017/0317759 A1* | 11/2017 | Agazzi | H04L 7/0075 |
| 2020/0280369 A1* | 9/2020 | Huang | H04B 10/25133 |

FOREIGN PATENT DOCUMENTS

CN 102308499 * 1/2015 ....... H04B 10/25133

OTHER PUBLICATIONS

Fang et al., "All-Fiber Polarization Beam Splitting and Rotating Based on Vector-Mode-Assisted Coupling," Optics Express, vol. 26, No. 12, Jun. 11, 2018, pp. 15124-15137.

Kudo et al., "Coherent Optical Single Carrier Transmission Using Overlap Frequency Domain Equalization for Long-Haul Optical Systems", Journal of Lightwave Technology, vol. 27, No. 16, Sep. 2009, pp. 3721-3728.

(Continued)

*Primary Examiner* — Nathan M Cors
(74) *Attorney, Agent, or Firm* — Shumaker & Sieffert, P.A.

(57) ABSTRACT

Techniques are described for providing a hybrid compensation of chromatic dispersion in optical networks to reduce power consumption by coherent receivers. In some examples, a controller may receive a chromatic dispersion value of an optical signal from a coherent receiver integrated with a receiver optical network device. The controller may compare the chromatic dispersion value with a threshold. The controller may, in response to determining that the chromatic dispersion value satisfies the threshold, perform at least one of: configure a switch connected to a dispersion compensation module (DCM) with a state to provide access to the DCM to compensate the chromatic dispersion value of the optical signal, or adjust a phase response of a filter of a coherent transmitter to compensate the chromatic dispersion value of the optical signal.

20 Claims, 5 Drawing Sheets

(56) References Cited

OTHER PUBLICATIONS

Xu et al., "Chromatic Dispersion Compensation in Coherent Transmission System Using Digital Filters," Optics Express, vol. 18, No. 15, Jul. 19, 2010, pp. 16243-16257.
Yue et al., "Transmitter skew tolerance and spectral efficiency tradeoff in high baud-rate QAM optical communication systems", Optics Express, vol. 26, No. 12, Jun. 11, 2018, pp. 15045-15058.
International Search Report and Written Opinion of International Application No. PCT/US2022/082348 dated Feb. 9, 2023, 10 pp.

* cited by examiner

HYBRID COMPENSATION OF CHROMATIC DISPERSION IN OPTICAL NETWORKS

TECHNICAL FIELD

The disclosure relates to computer networks and, more specifically, to optical networks.

BACKGROUND

A network services exchange provider or co-location provider (a "provider") may employ a communication facility, such as a data center, in which multiple customers of the provider locate network, server, and storage gear and interconnect to a variety of telecommunications and other network service provider(s) with a minimum of cost and complexity. Such customers are said to be "colocated" in the data center. Data centers may be shared by the multiple tenants locating networking equipment within the data centers. With IT and communications facilities in safe, secure hands, telecommunications, Internet, application service providers, cloud service providers, content providers, and other providers, as well as enterprises, enjoy less latency and the freedom to focus on their core business.

In some cases, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "co-location facility." The facility provider may provide services accessible to colocated customers via an interconnection, such services including, for example, a cloud exchange, Internet access, an Internet exchange, a cross-connect from one customer to another, and other interconnection services.

One example of interconnection between different networks within an interconnection facility is a physical cross-connect, in which the provider installs a physical cable (such as a CAT5/6, coax, or optical fiber cable) that then provides a physical (e.g., "layer 0") connection between the customer networks for inter-customer interconnections (between different customers) or intra-customer interconnections (between areas of an interconnection center(s) that are operated/leased by a single customer). For example, a fiber cross-connect may be installed across the floor of an interconnection facility, between floors, across campuses, across distributed interconnection facilities within a metropolitan area (or "metro"), and across distributed interconnection facilities within connection facilities of different metropolitan areas.

Optical signals traversing a fiber cross-connect may experience chromatic dispersion in which the optical signal is distorted (e.g., broadened) and may overlap with adjacent pulses resulting in degraded signal quality. In some examples, coherent receivers that are directly integrated into a panel of an optical network device (e.g., router or switch) may include a digital signal processor (DSP) to compensate the chromatic dispersion. In some instances, the compensation of chromatic dispersion may require more power to be consumed by the DSP and causes an increased amount of heat, which affects the performance of the optical network device, the allowable density of the panel (e.g., number of modules fit into the panel of the networking device), and the overall cost to provide optical communications.

SUMMARY

In general, techniques are described for a hybrid compensation of chromatic dispersion in optical networks to reduce power consumption by coherent receivers. For example, an optical network includes a coherent receiver, at a receiving end of an optical signal, that receives the optical signal having a chromatic dispersion value. Depending on the chromatic dispersion value (e.g., due to the distance the optical signal travels), the coherent receiver may compensate the chromatic dispersion of the optical signal using additional data points, which consumes a greater amount of power. To reduce the power consumed by the coherent receiver, a controller, e.g., software-defined networking (SDN) controller, for the interconnection system obtains the chromatic dispersion value from the coherent receiver and determines whether power consumption by the coherent receiver may be improved, e.g., by comparing the chromatic dispersion value with a threshold to determine whether the chromatic dispersion value requires the coherent receiver to process a larger number of data points to correct the chromatic dispersion of the optical signal. In response to determining that compensation of the chromatic dispersion value requires the coherent receiver to process a larger number of data points, the controller configures, as one example, a switch, connected to a dispersion compensation module (DCM) pre-provisioned in the optical path, with a "cross" state that switches the optical signal to the DCM to cause the DCM to perform chromatic dispersion compensation. Alternatively, or additionally, the controller causes a coherent transmitter that transmits the optical signal to adjust a filter (e.g., tune a phase response of a Finite Impulse Response (FIR) filter) to adjust the chromatic dispersion value of the optical signal when sending the optical signal on the optical path.

The techniques described in this disclosure may provide one or more technical advantages that realize one or more practical applications. For example, by selectively applying a DCM pre-provisioned along the optical path and/or by adjusting the filter of the coherent transmitter to compensate the chromatic dispersion, the coherent receiver may receive an optical signal with a lower chromatic dispersion value that allows the DSP of the coherent receiver to process fewer data points while still correcting the chromatic dispersion of the optical signal, thereby consuming less power. By consuming less power, less heat is generated by the coherent receiver and thus the overall heat of the optical network device that the coherent receiver is integrated with is reduced. Such heat reduction at the optical network device may enable increased optical port density for front panels of the optical network device, which reduces the Total Cost of Ownership (TCO) to provide optical communications.

In some examples, a method comprises receiving, by a controller, a chromatic dispersion value indicating an amount of chromatic dispersion of an optical signal received at a coherent receiver integrated with a receiver optical network device. The method also includes comparing, by the controller, the chromatic dispersion value with a threshold. The method further includes, in response to determining that the chromatic dispersion value satisfies the threshold, performing at least one of: configuring a switch to switch the optical signal to a dispersion compensation module (DCM) to cause the DCM to compensate the chromatic dispersion of the optical signal, or adjusting a phase response of a filter of a coherent transmitter to compensate the chromatic dispersion of the optical signal.

In some examples, a controller comprises a memory and one or more processors operably coupled to the memory, wherein the one or more processors are configured to: receive a chromatic dispersion value indicating an amount of chromatic dispersion of an optical signal received at a coherent receiver integrated with a receiver optical network device; compare the chromatic dispersion value with a threshold; in response to determining that the chromatic dispersion value satisfies the threshold, perform at least one of: configure a switch to switch the optical signal to a dispersion compensation module (DCM) to cause the DCM to compensate the chromatic dispersion value of the optical signal, or adjust a phase response of a filter of a coherent transmitter to compensate the chromatic dispersion of the optical signal.

In some examples, an interconnection system comprises a coherent receiver integrated with a receiver optical network device, wherein the coherent receiver is configured to: receive an optical signal; determine a chromatic dispersion value indicating an amount of chromatic dispersion of the optical signal; send, to the controller, the chromatic dispersion value of the optical signal. The interconnection system also includes a controller, wherein the controller is configured to: receive the chromatic dispersion value of the optical signal from the coherent receiver; compare the chromatic dispersion value with a threshold; in response to determining that the chromatic dispersion value satisfies the threshold, perform at least one of: configure a switch to switch the optical signal to a dispersion compensation module (DCM) to cause the DCM to compensate the chromatic dispersion of the optical signal, or adjust a phase response of a filter of a coherent transmitter to compensate the chromatic dispersion of the optical signal.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
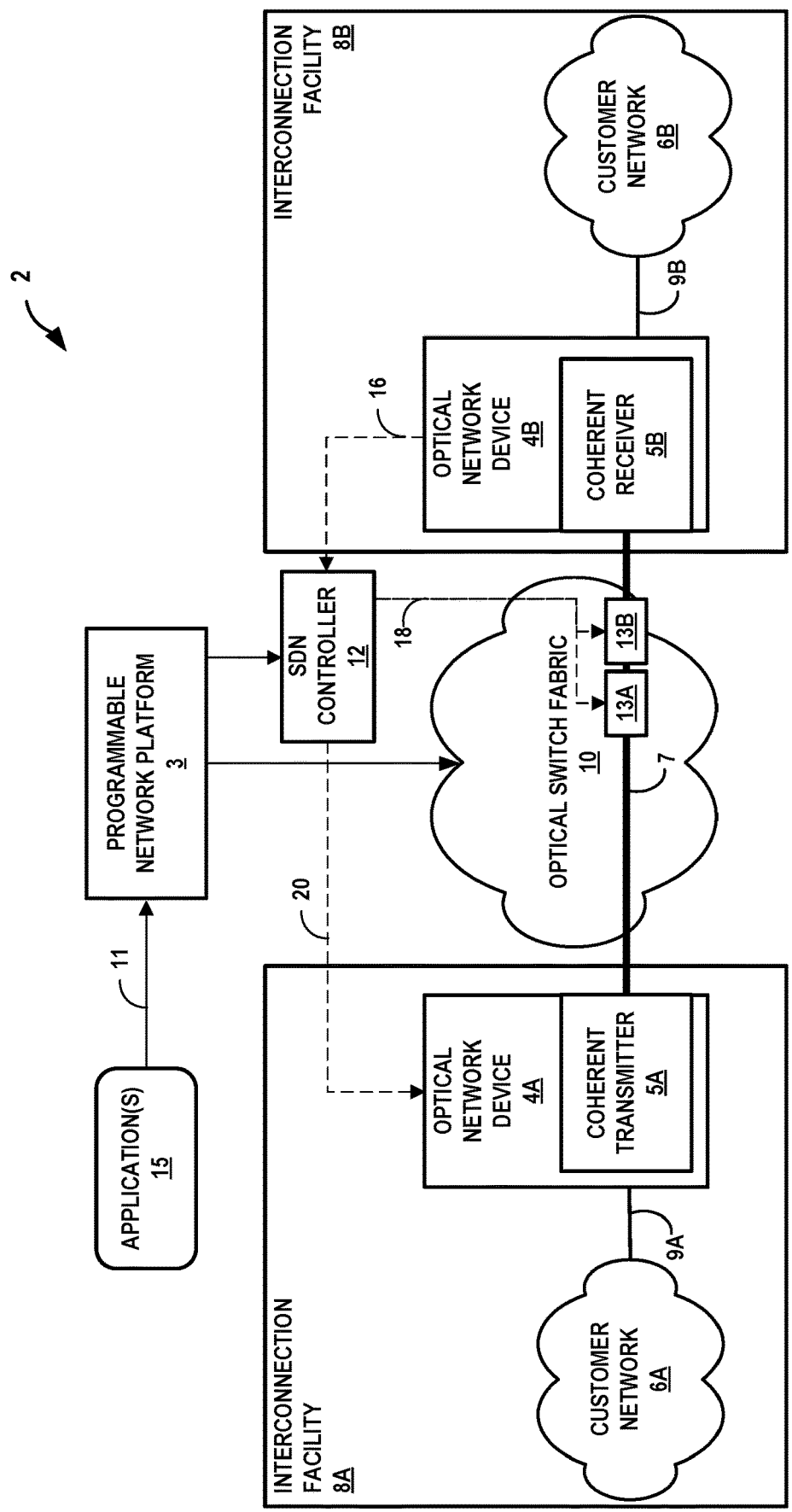
FIG. 1 is a block diagram that illustrates a high-level view of an interconnection system providing a hybrid compensation of chromatic dispersion in optical networks to reduce power consumption by coherent receivers, in accordance with the techniques described in this disclosure.

FIG. 1 is a block diagram that illustrates a high-level view of an interconnection system 2 providing a hybrid compensation of chromatic dispersion in optical networks to reduce power consumption by coherent receivers, in accordance with the techniques described in this disclosure. Interconnection system 2 depicts interconnection facilities 8A-8B (collectively, "interconnection facilities 8") operated by an interconnection system provider, the interconnection facilities 8 connected by an optical switch fabric 10 configurable for cross-connecting customer networks 6A-6B (collectively, "customer networks 6"). In some instances, each of customer networks 6 may be associated with a different customer of the interconnection system provider. In some instances, customer networks 6 are both associated with a single customer of the interconnection system provider. As used herein, the term "customer" of the interconnection system provider may refer to a tenant of an interconnection facility 8 deployed by the interconnection system provider, whereby the customer leases space within the interconnection facility 8 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity.

Each of interconnection facilities 8 may represent different data centers geographically located within different metropolitan areas (e.g., New York City, Dallas, Tex., etc.) to provide resilient and independent interconnection services exchange by which customers of one metropolitan area and customers of a different metropolitan area may connect to receive and provide, respectively, services.

In each of the interconnection facilities 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the same interconnection facility 8 and/or to other customer(s) co-located in another interconnection facility 8.

Optical switch fabric 10 represents optical and photonic switching infrastructure that is configured by programmable network platform 3 to create a fiber cross-connect 7 that connects customer network 6A and customer network 6B co-located in interconnection facilities 8A and 8B, respectively. Optical switch fabric 10 includes pre-installed optical fiber between customer networks 6 and at least one distribution facility (or "distribution frame") of the interconnection facilities 8 and may further include pre-installed optical fiber between multiple distribution facilities of the interconnection facilities 8. Optical switch fabric 10 further includes programmable photonic switches, e.g., optical network devices 4A and 4B (collectively, "optical network devices 4"), located within distribution facilities of the interconnection facilities 8 and/or located at the demarcation of customer space located in interconnection facilities 8.

Each of optical network devices 4 may represent a photonic cross-connect (PXC), optical cross-connect (OXC), optoelectronic based switch (OEO), or other types of devices that switch optical signals. Each of optical network devices 4 may route optical signals (light beams or lambdas) between optical fibers coupled to the switch. Each of optical network devices 4 may include large port-count switches.

System 2 further includes a programmable network platform (PNP) 3, alternatively referred to herein as an "interconnection platform." Programmable network platform 3 may expose a software interface that defines the methods, fields, and/or other software primitives by which application(s) 15 may invoke PNP 3 to dynamically provision a fiber cross-connect 7 between customer networks 6A, 6B. In this way, PNP 3 allows customers, carriers, network service providers (NSPs), and/or the interconnection system provider itself with the programmatic capability of configuring optical switch fabric 10 to interconnect customer network 6A to customer network 6B with fiber cross-connect 7.

Programmable network platform 3 may represent an application executing within one or more data centers of system 2 or alternatively, off-site/remotely at a back office or branch of the interconnection system 2 provider, for instance. Programmable network platform 3 may be distributed in whole or in part among the data centers. As illustrated in FIG. 1, programmable network platform 3 may control service provisioning for multiple different interconnection facilities. Alternatively, or additionally, multiple separate instances of the programmable network platform 3 may control service provisioning for respective multiple different interconnection facilities.

Application(s) 15 represents at least one application that communicates with PNP 3 to request and dynamically provision an interconnection between interconnection facilities 8 of customer networks 6A, 6B. Application(s) 15 represent client-side software for interfacing with PNP 3 and may include a customer portal, customer applications, an interconnection system 2 provider application that is accessible only to operators of interconnection facilities 8, a console such as a command-line interface or graphical user interface. Users or clients of application(s) 15 may include enterprise customers, cloud service and content providers, carriers, network service providers (NSPs), and/or the interconnection system provider itself, for instance.

An application of application(s) 15 issues, to PNP 3, an interconnection request 11 that specifies parameters for interconnecting between interconnection facilities 8 of customer networks 6A and 6B. In response to receiving interconnection request 11, PNP 3 determines a path for the interconnection, e.g., an optical path through optical switch fabric 10, and dynamically provisions a path for the interconnection with fiber cross-connect 7 in optical switch fabric 10 to provide fiber-based interconnection between customer networks 6A, 6B to satisfy the interconnection request 11.

PNP 3 configures elements of optical switch fabric 10 by issuing configuration commands either directly to elements within switch fabric 10 by way of configuration interfaces of the elements, or indirectly to such elements via software-defined networking (SDN) controllers, e.g., SDN controller 12, that manage the elements on behalf of the PNP 3. PNP 3 may in some instances be alternatively referred to as an orchestrator in that PNP 3 orchestrates SDN controller 12 so as to configure optical network devices 4 (e.g., photonic switches) and/or other elements of optical switch fabric 10 to establish fiber cross-connect 7.

Programmable network platform 3 configures optical network devices 4 to switch optical signals along optical paths, each optical path beginning at an optical transmitter and terminating at an optical receiver and each of the optical transmitter and optical receiver being associated with one of customer networks 6. In this way, customer networks 6 may exchange frames and packets for L0/L1/L2/L3 services via dynamically provisioned fiber cross-connects. An optical path may alternatively be referred to as an optical path, a light path, a lambda or an optical transport network wavelength, or a composite DWDM optical signal. Example bandwidths for an optical path for a cross-connect may include, e.g., 2.5 Gbps, 10 Gbps, 40 Gbps, 100 Gbps, 400 Gbps, or even multi-terabit DWDM optical signals. An optical fiber may include multiple optical paths, i.e., the optical fiber may transport optical signals for multiple optical paths as different lambdas, for instance. Optoelectronic-based switches may limit switching applications according the data rate, protocol, and format supported by the electronic components of switches.

Fiber cross-connect 7 may represent a Layer 0 ("L0") connection in that the fiber cross-connect underlies the Open Systems Interconnection (OSI) model or TCP/IP model for packet networking. In particular, fiber cross-connect 7 may underlie an optical transport network (OTN) layer that (typically in conjunction with a SONET/SDH layer) provides Layer 1 ("L1") connectivity between optical network devices 4 such as wavelength division multiplexing (WDM) devices. For instance, fiber cross-connect 7 may represent one or more wavelengths (or "lambdas") photonically switched by elements of optical switch fabric to provide an optical path (or "light path") for optical signals exchanged between customer networks 6A, 6B associated with different customers/tenants of the interconnection system 2 provider. In this way, optical switch fabric 10 is configured to provide non-blocking switching by way of a high-speed fiber connection between respective customers networks 6A, 6B for the customers of the interconnection system 2 provider and, in doing so, may provide reliable and low-latency communication between customer networks 6A, 6B.

Customer networks 6A, 6B use respective access links 9A, 9B to access fiber cross-connect 7 to exchange data. Access links 9A, 9B may represent, in some instances, grey links/optics, in which a router or switch of customer networks 6A, 6B exchanges grey (uncolored) optical signals with a coherent optical device that converts between a grey optical signal and an optical signal at a specific wavelength (color) exchanged with an optical network device of optical switch fabric 10. In some examples, a pluggable coherent optical device may be directly integrated to an optical network device (e.g., panel of the optical network device), which eliminates the need for short-reach optical pluggable module.

Fiber cross-connect 7 may in some cases underlie a layer 2 ("L2") or layer 3 ("L3") service provided by the interconnection system 2 provider to interconnect customer networks 6A, 6B according to an L2 or L3 service. For example, interconnection facility 8 may operate a network services exchange, such as Ethernet Exchange, and Internet Exchange, and/or a Cloud Exchange, and each of these may make use of dynamically provisioned fiber cross-connect 7 to transmit L2/L3 packet data between customer networks 6A, 6B.

In the example of FIG. 1, optical network device 4A may include a coherent transmitter 5A integrated with optical network device 4A to provide coherent modulation of optical signals to transmit the optical signals to optical network device 4B via optical switch fabric 10. Similarly, optical network device 4B may include a coherent receiver 5B integrated with optical switch device 4B to receive optical signals from optical network device 4A via optical switch fabric 10. Although optical network devices are described as including a coherent transmitter or coherent receiver, each of the optical network devices may include a coherent transceiver configured to transmit and receive optical signals. In some examples, each of the coherent transmitter 5A and coherent receiver 5B includes a digital signal processor (DSP) to correct the chromatic dispersion of the optical signal. In fiber optic communications, an optical signal traversing the optical fiber may experience chromatic dispersion in which the optical signal is distorted (e.g., broadened) and may overlap with adjacent pulses resulting in degraded signal quality. To correct the chromatic dispersion, the DSP of the coherent receiver may implement, for example, a Fast Fourier Transform (FFT) function to convert optical signals in the time domain to the frequency domain, apply one or more filters to correct the chromatic dispersion of the optical signal in the frequency domain, and use Inverse FFT (IFFT) function to convert the corrected optical signals back into the time domain.

Figure 5:
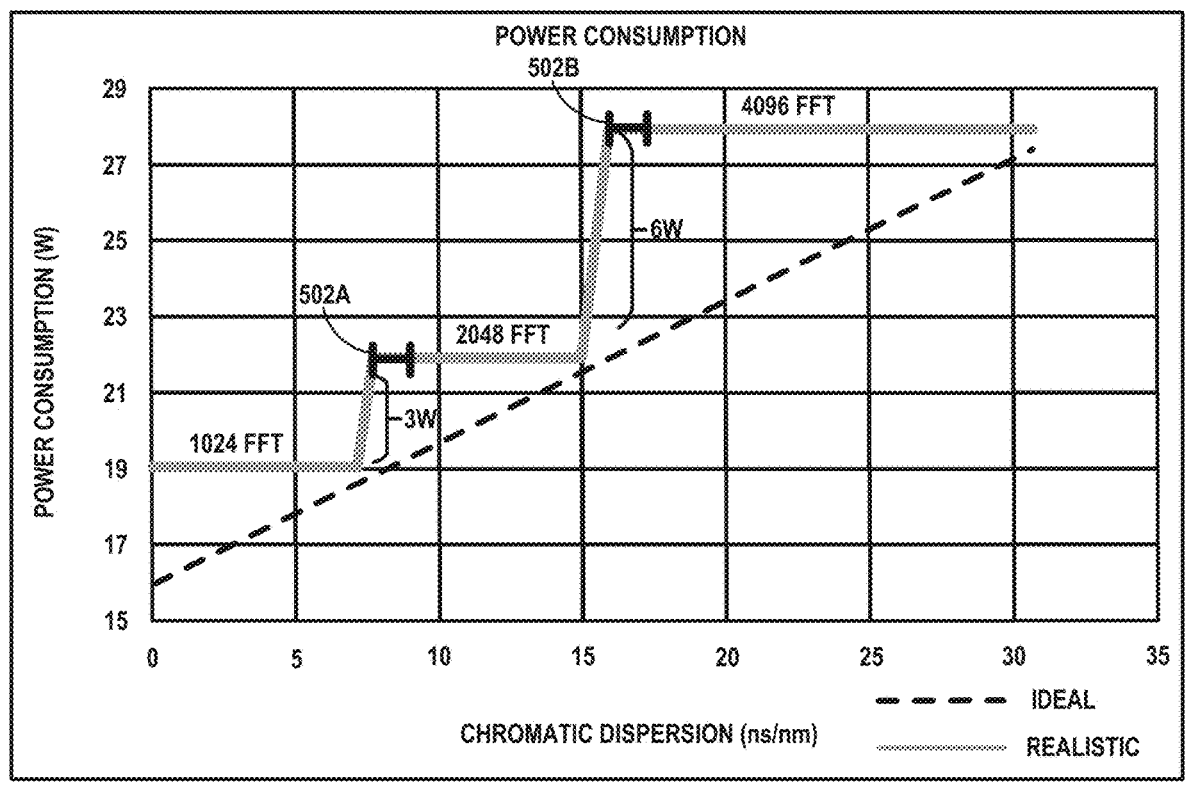
FIG. 5 illustrates an example of a step function when processing different data points of optical signals with a Fast Fourier Transform (FFT) function or inverse FFT (IFFT) function, with thresholds in accordance with techniques described in this disclosure.

The amount of chromatic dispersion of an optical signal is linearly related to the transmission distance of optical path that carries the optical signal. That is, the further the length of transmission of the optical signal, the higher the chromatic dispersion. To compensate for chromatic dispersion of optical signals traversing greater distances, the DSP may typically process additional data points of the optical signals with the FFT function, which increases the power consumption by the DSP. For example, the FFT and IFFT function uses a base 2 logarithm and therefore the DSP processes data points equal to a 2-to-the-nth-power number (e.g., 1024, 2048, 4096 points, etc.). By processing the data points in this way, the actual power consumption by the DSP is similar to a step function dependent on the number of points in the FFT/IFFT (e.g., the DSP may consume a different amount of power to process each of the data point levels). An example of the step function is illustrated in FIG. 5. As one example, for an optical signal traveling on a single mode fiber (SMF) for a first distance (e.g., 470 kilometers (km)) resulting in a chromatic dispersion value of 7 ns/nm, the DSP of a coherent receiver (e.g., 200 Gbps coherent receiver) may process a first level of data points (e.g., 1024) to correct the chromatic dispersion of the optical signal, which consumes a first power (e.g., 19 watts (W)). For an optical signal traveling a second distance that is greater than the first distance (e.g., 480 km) resulting in a chromatic dispersion value of 9 ns/nm, the DSP may process a next level of data points (e.g., 2048) to correct the chromatic dispersion of the optical signal, which consumes a second power that is greater than the first power (e.g., 22 W). That is, the power consumed by the DSP jumps to a higher amount if the DSP is to process the next level of data points to compensate for the chromatic dispersion (e.g., an increase of 3 watts). Similarly, for an optical signal traveling a third distance that is greater than the second distance resulting in a chromatic dispersion value of 16 ns/nm, the DSP of the coherent receiver may process a third level of data points (e.g., 4096) to correct the chromatic dispersion of the optical signal, which consumes a third power that is greater than the second power (e.g., 28 W). The increase in power consumption causes an increased amount of heat, which may affect the performance of the optical network device having the integrated coherent receiver. To compensate for the heat issue, an administrator may, in some examples, use a larger pluggable coherent receiver that may dissipate heat more efficiently, but this reduces the density of the panel of the optical network device (e.g., reduce the number of ports that can fit onto the panel). This increases the cost to provide additional optical interconnections because additional resources are needed for the additional optical interconnections. In some examples, an administrator may add an external heat sink to the pluggable coherent receiver to resolve the heat issue. However, an external heat sink is typically placed on a section which is protruding from the optical network device, which limits the size of external heat sink and its capability to dissipate heat.

In accordance with techniques described in this disclosure, interconnection system 2 may provide a hybrid compensation of chromatic dispersion in optical networks to reduce power consumption by coherent receiver. For example, in addition to compensating chromatic dispersion at the coherent receiver, one or more dispersion compensation modules (DCMs), e.g., DCMs 13A, 13B (collectively, "DCMs 13"), that are pre-provisioned along the optical path (e.g., integrated into optical amplifiers on the optical path) may be selectively applied (e.g., via switches configured with different states) to compensate a portion of the chromatic dispersion such that the coherent receiver receives the optical signal with a lower chromatic dispersion value, which may cause the coherent receiver to use less power to compensate the chromatic dispersion of the optical signal than would otherwise be used to compensate the chromatic dispersion of the optical signal without the use of the DCM. In general, a DCM provides negative chromatic dispersion of an optical signal. DCMs 13 may be implemented through either dispersion compensating fiber (DCF) or long-period fiber Bragg grating (FBG), for example. Each of DCMs 13 may provide a negative chromatic dispersion for an optical signal of a corresponding wavelength. In some examples, a single DCM 13 may provide negative chromatic dispersion for a plurality of wavelengths. Moreover, DCMs 13 operate as a passive optical component, which does not consume power, and thus does not cause an increase in power consumption.

In the example of FIG. 1, a DSP of coherent receiver 5B may initially perform compensation of chromatic dispersion and the DSP may report the accumulated chromatic dispersion value of the optical signal. A controller, e.g., SDN controller 12, of interconnection facility 8 may receive message 16 that includes the chromatic dispersion value (e.g., temporal spread per unit propagation distance (ps/nm/km)) of an optical signal received at coherent receiver 5B. SDN controller 12 may, for example, compare the chromatic dispersion value of the optical signal with a threshold set to a chromatic dispersion value (referred to herein as "chromatic dispersion threshold") that triggers the hybrid compensation of chromatic dispersion in accordance with the techniques. The chromatic dispersion threshold, e.g., chromatic dispersion thresholds 502A-502B of FIG. 5, may be defined as an edge chromatic dispersion value or range at which the receiver coherent receiver 5B changes a number of points in a FFT used to compensate the chromatic dispersion. As one example, an administrator may use SDN controller 12 to set the chromatic dispersion threshold 502A between 9 ns/nm to 10 ns/nm. The administrator may set the chromatic dispersion threshold to any edge chromatic dispersion value or range. In response to determining that the chromatic dispersion value of the optical signal satisfies the chromatic dispersion threshold 502A, SDN controller 12 may configure, with one or more configuration messages, e.g., configuration messages 18, one or more optical switches connected to DCMs 13, respectively, with a "cross" state to switch the optical signal to the one or more DCMs to compensate the chromatic dispersion of the optical signal. In some examples, SDN controller 12 may configure the optical switch actively switching optical signals to DCM 13 with a "bar" state to switch the optical signal to bypass the DCM. For example, the use of DCMs 13 have intrinsic loss, which causes a small degradation on link performance. As such, the DCMs 13 may, in some examples, be configured with a "bar" state to improve link performance. In these examples, the chromatic dispersion threshold may specify a threshold in which the benefit of reducing power consumption by configuring the DCMs in a "cross" state may outweigh the small degradation on link performance caused by the use of DCMs.

In some examples, the use of the one or more DCMs may provide compensation of chromatic dispersion across multiple channels (e.g., for optical signals with different wavelengths), where a mesh of different optical channels may have different compensation requirements, and is referred to as "coarse chromatic dispersion compensation." In some examples, compensation of chromatic dispersion across multiple channels may include overcompensation for some of the optical channels while other optical channels are undercompensated.

In some examples, SDN controller 12 may, in response to determining that the chromatic dispersion value of the optical signal satisfies the chromatic dispersion threshold, additionally, or alternatively, send a configuration message 20 to cause transmitter coherent transmitter 5A to tune a phase response of a Finite Impulse Response (FIR) filter to provide compensation of chromatic dispersion. For example, transmitter coherent transmitter 5A may include an FIR filter that provides Nyquist pulse shaping of individual channels in the time domain. Nyquist pulse shaping is typically used to increase the spectral efficiency for Dense Wavelength Division Multiplexing (DWDM) systems. With Nyquist pulse shaping, the spectrum of an optical signal can be characterized with a roll-off factor ($\alpha$) which is between 0 and 1. When $\alpha=0$, the spectrum shapes like a rectangle. When $\alpha=1$, the spectrum resembles the function of $\sin(x)/x$. The smaller the a, the sharper the roll-off. Nyquist pulse shaping may provide a higher spectral efficiency. Nyquist pulse shaping can be achieved through the adjustment of an amplitude response of the FIR filter. Because chromatic dispersion influences the phase of an optical signal, the adjustment of the phase response of the FIR filter may adjust the chromatic dispersion of the optical signal. The tuning of the phase response of the FIR filter may thus provide fine tuning of chromatic dispersion on individual channels. The adjustment of the phase response using the FIR filter does not increase the total power consumption of the coherent transmitter.

By compensating the chromatic dispersion using a DCM pre-provisioned along the optical path and/or by tuning the phase response of an FIR filter of coherent transmitter 5A, coherent receiver 5B may receive an optical signal with a lower chromatic dispersion value that causes coherent receiver 5B to process a lower level of data points (e.g., 1024) to correct the chromatic dispersion of the optical signal, thereby consuming less power.

Figure 2:
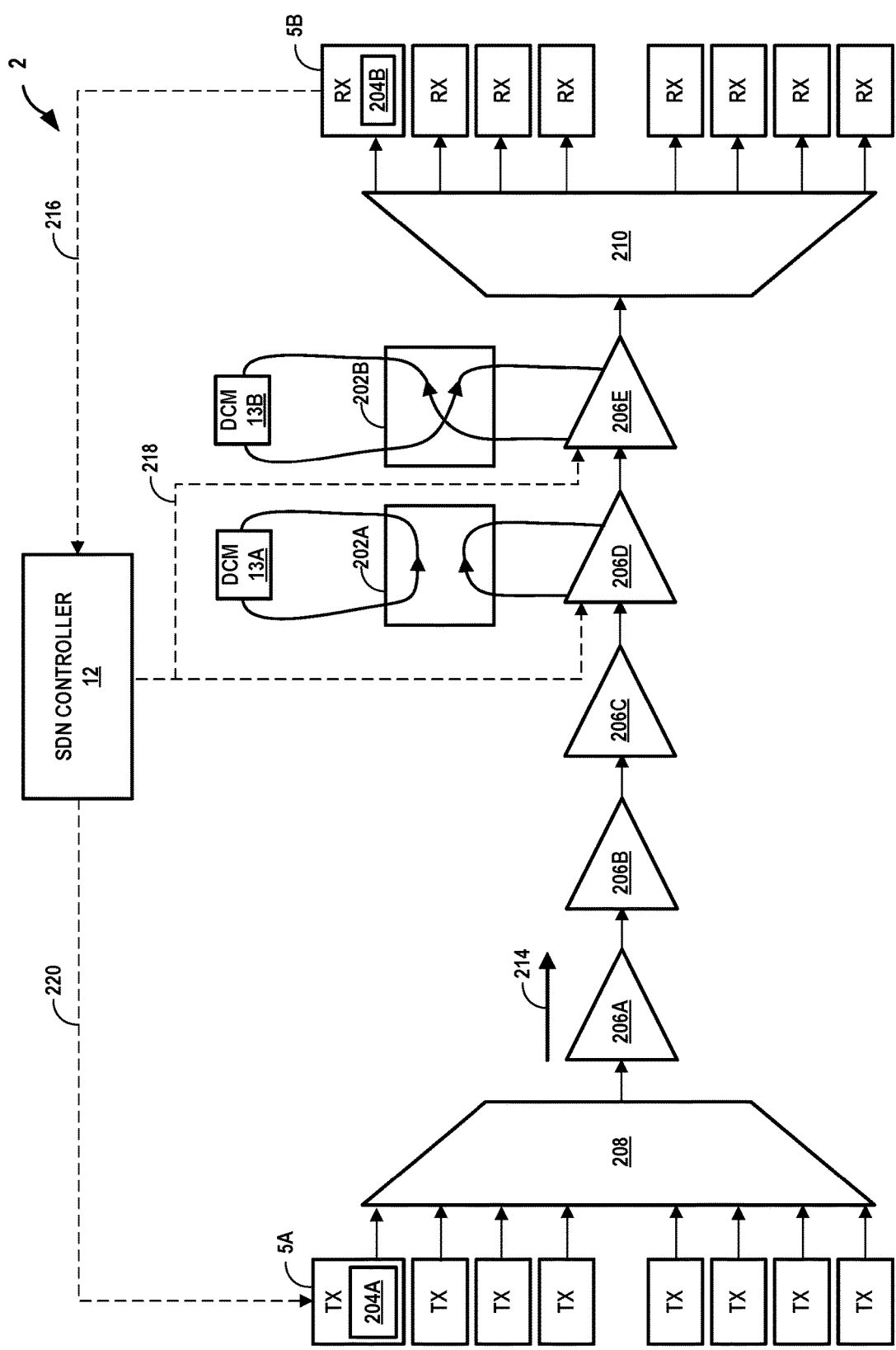
FIG. 2 is a block diagram that illustrates, in further detail, an interconnection system providing a hybrid compensation of chromatic dispersion in optical networks to reduce power consumption by coherent receivers, in accordance with the techniques described in this disclosure.

FIG. 2 is a block diagram that illustrates, in further detail, an interconnection system providing a hybrid compensation of chromatic dispersion in optical networks to reduce power consumption by coherent receivers, in accordance with the techniques described in this disclosure. In the example of FIG. 2, coherent transmitter 5A and coherent receiver 5B may represent an example implementation of coherent transmitter 5A and coherent receiver 5B of FIG. 1.

In the example of FIG. 2, coherent transmitter 5A and coherent receiver 5B provide modulation of optical signals. In this example, coherent transmitter 5A may represent an optical transmitter for sending optical signals and coherent receiver 5B may represent an optical receiver for receiving optical signals. In some examples, interconnection system 2 may include a DWDM multiplexer 208 that provides optical dense wave-division multiplexing of a plurality of wavelengths. Coherent transmitter 5A includes a digital signal processor (DSP) 204A that provides Nyquist pulse shaping of optical signals implemented through Finite Impulse Response (FIR) filters.

In some examples, interconnection system 2 may include DWDM demultiplexer 210 that provides demultiplexing of the plurality of wavelengths. Coherent receiver 5B includes DSP 204B to correct chromatic dispersion of an optical signal. For example, DSP 204B may implement a Fast Fourier Transform (FFT) function to convert optical signals in the time domain to the frequency domain, apply one or more filters to correct the chromatic dispersion of the optical signal in the frequency domain, and use Inverse FFT (IFFT) function to convert the corrected optical signals back into the time domain.

Depending on the chromatic dispersion value of an optical signal, which is linearly related to the transmission distance of the optical signal, DSP 204B may implement the FFT function with different data points. For example, coherent receiver 5B may receive a first optical signal traversing a first distance (e.g., below 470 km) that has a first chromatic dispersion value (e.g., 0 ns/nm through 8 ns/nm) that would necessitate the use of 1024 data points to correct the chromatic dispersion of the first optical signal. Similarly, coherent receiver 5B may receive a second optical signal traversing a second distance that is greater than the first distance (e.g., between 480 km and 800 km) and has a second chromatic dispersion value (e.g., 9 ns/nm through 15 ns/nm) that would necessitate the use of 2048 data points to correct the chromatic dispersion of the second optical signal. Likewise, coherent receiver 5B may receive a third optical signal traversing a third distance (e.g., between 800 km and 900 km) that is greater than the second distance and has a third chromatic dispersion value (e.g., 16 ns/nm through 32 ns/nm) that would necessitate the use of 4096 data points to correct the chromatic dispersion of the third optical signal, and so on. In the above example, if coherent receiver 5B receives the first optical signal, DSP 204B uses 1024 data points to correct the chromatic dispersion of the first optical signal, which consumes a first power (e.g., 19 W). If coherent receiver 5B receives the second optical signal, DSP 204B uses 2048 data points to correct the chromatic dispersion of the second optical signal, which consumes a second power (e.g., 22 W).

In some examples, coherent receiver 5B may receive an optical signal, e.g., optical signal 214, that traverses a distance just beyond 470 km having a chromatic dispersion value of 10 ns/nm. In these examples, DSP 204B may typically use the next level of data points (e.g., 2048) that would result in a greater power consumption. In this example, coherent receiver 5B may send the chromatic dispersion value to SDN controller 12 (illustrated as element 216). For example, SDN controller 12 and coherent receiver 5B may use gRPC, REST API, NETCONF, or other mechanisms to communicate chromatic dispersion values.

In response to receiving the chromatic dispersion value from coherent receiver 5B, SDN controller 12 determines whether to apply the hybrid compensation of chromatic dispersion to reduce power consumption by coherent receiver 5B of optical network device 4B. As one example, the threshold may be set to an edge chromatic dispersion value or range that corresponds to a value or range that would cause DSP 204B to use of the next level of data points for an FFT or IFFT to compensate the chromatic dispersion. For instance, the threshold may specify a chromatic dispersion value greater than 8 ns/nm that corresponds to the use of 2048 data points for an FFT or IFFT to compensate the chromatic dispersion, a chromatic dispersion value greater than 16 ns/nm that corresponds to the use of 4096 data points for an FFT or IFFT to compensate the chromatic dispersion, or the like. In this example, the threshold may specify a chromatic dispersion value greater than 8 ns/nm. SDN controller 12 may compare the chromatic dispersion value (10 ns/nm) for optical signal 214 to a threshold value (greater than 8 ns/nm) and determines that the chromatic dispersion value received from coherent receiver 5B exceeds the threshold, and thus DSP 204B would use or is using the next level of data points to correct the chromatic dispersion.

In response to determining the chromatic dispersion value of the optical signal received at coherent receiver 5B satisfies the threshold, SDN controller 12 may send a configuration message 218 to one or more switches, e.g., switches 202A and/or 202B (collectively, "switches 202"), to switch the optical signal to a DCM, e.g., DCMs 13A and 13B, respectively, that are pre-provisioned on the optical path to perform compensation of chromatic dispersion of optical signal 214. DCMs 13 may be pre-provisioned near the coherent receiver, e.g., coherent receiver 5B, such as in the middle of the optical path or near the end of the optical path. In the example of FIG. 2, a DCM is included in one or more of optical amplifiers 206A-206E (collectively, "optical amplifiers 206"). Each of optical amplifiers 206 may represent an Erbium doped fiber amplifier (EDFA) to amplify an optical signal. In this example, optical amplifier 206D may include switch 202A to switch optical signals to DCM 13A. Similarly, optical amplifier 206E may include switch 202B to switch optical signals to DCM 13B. Each of switches 202 may include a MEMs switch, an integrated photonic switch, or other micro-form factor switches integrated with optical amplifiers 206 or other optical devices on the optical path. Switches 202 may represent 2×2 optical switches that may switch the optical signal to a DCM or switch the optical signal to bypass the DCM. For example, a switch 202 may include one input/output pair to switch an optical signal to a DCM and a second input/output pair to switch an optical signal to bypass the DCM. In some examples, the DCMs 13 are also integrated in the optical amplifiers 206. For example, DCM 13A is integrated in optical amplifier 206D and DCM 13B is integrated in optical amplifier 206E.

In this example, SDN controller 12 may configure switch 202B in a "cross" state to provide access to DCM 13B to perform chromatic dispersion of optical signal 214. Alternatively, when the hybrid compensation of chromatic dispersion is no longer applied, SDN controller 12 may configure the switch 202B in a "bar" state to switch the optical signal to bypass DCM 13B. In some examples, SDN controller 12 may configure a plurality of switches, e.g., switch 202A and 202B, to each switch the optical signal to a respective DCM to cause each of the DCMs to compensate the chromatic dispersion of the optical signal.

By configuring switch 202B in a "cross" state, switch 202B switches the optical signal to DCM 13B, which in turn may compensate chromatic dispersion of optical signal 214. In this example, DCM 13B may introduce negative chromatic dispersion such that coherent receiver 5B receives a chromatic dispersion value, e.g., less than 8 ns/nm, despite the optical signal traversing a distance that would normally result in a greater chromatic dispersion value (e.g., 10 ns/nm). In this way, DSP 204B of coherent receiver 5B does not use a larger number of data points (e.g., 2048) to correct the chromatic dispersion of the optical signal 214 and therefore does not consume a greater amount of power to correct the chromatic dispersion.

In some examples, SDN controller 12 may, in response to determining the chromatic dispersion value of the optical signal received at coherent receiver 5B satisfies the threshold, SDN controller 12 may cause the DSP 204A of coherent transmitter 5A to tune a phase response (e.g., adjusting phase coefficients or "taps") of a Finite Impulse Response (FIR) filter to adjust the chromatic dispersion value of the optical signal. The adjustment of the phase response of the FIR filter may introduce a negative chromatic dispersion such that coherent receiver 5B receives an optical signal with a lower chromatic dispersion value (e.g., between 0 ns/nm through 8 ns/nm) despite the optical signal traversing a distance that would normally result in a greater chromatic dispersion value (e.g., 10 ns/nm). In this way, coherent receiver 5B may receive an optical signal with a lower chromatic dispersion value, which does not cause the DSP 204B of coherent receiver 5B to use a larger number of data points (e.g., 2048) to correct the chromatic dispersion of the optical signal 214, and thus consumes less power when compensating the chromatic dispersion of the optical signal.

In some examples, the use of the one or more DCMs may provide compensation of chromatic dispersion across multiple channels (e.g., for optical signals with different wavelengths transmitted by other coherent transmitters), where a mesh of different optical channels may have different compensation requirements. In some examples, compensation of chromatic dispersion across multiple channels may include overcompensation for some of the optical channels while other optical channels are undercompensated.

Figure 3:
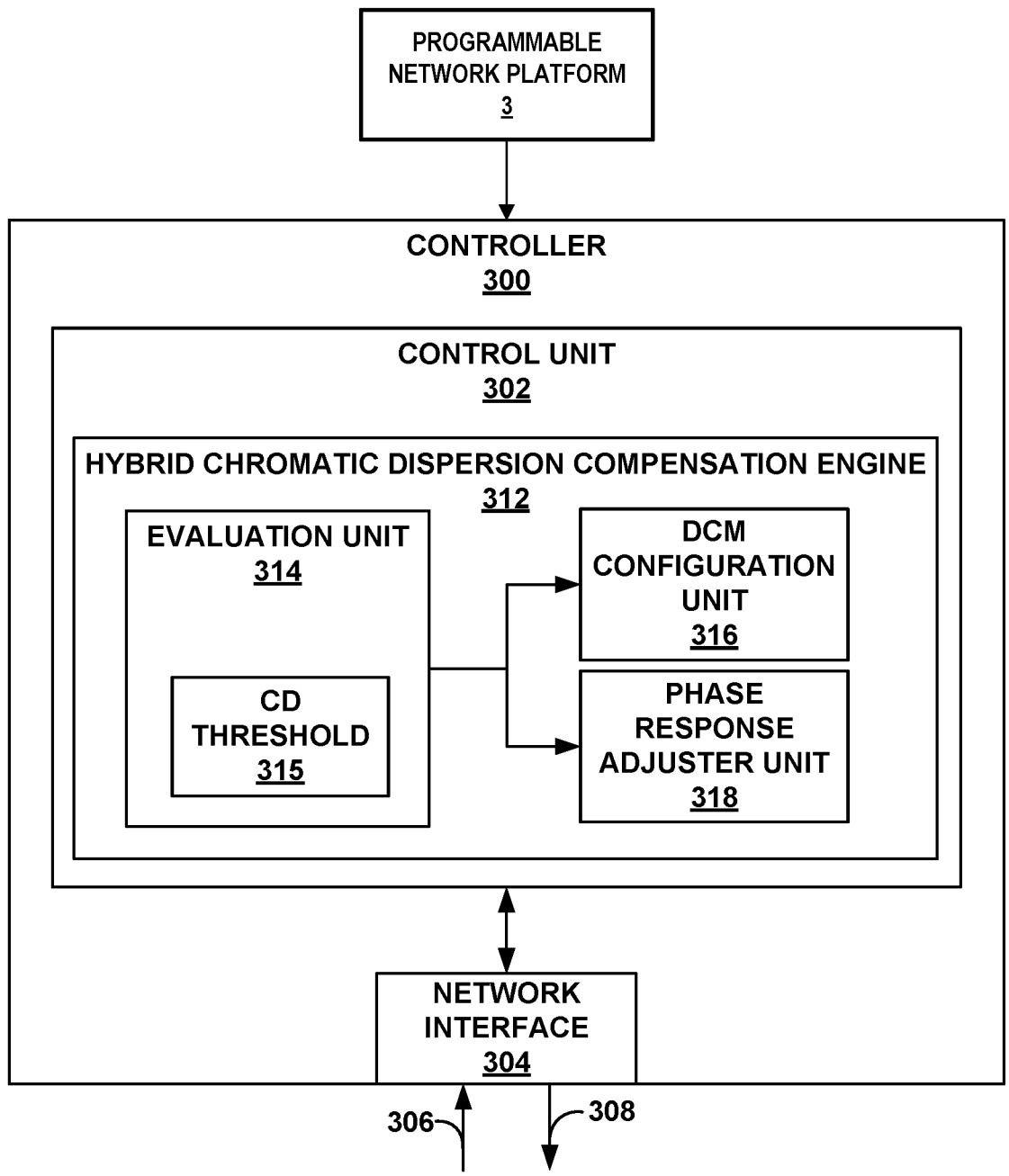
FIG. 3 is a block diagram illustrating an example of a computing device that operates in accordance with one or more techniques described in this disclosure.

FIG. 3 is a block diagram illustrating an example of a controller configured to operate in accordance with the techniques described in this disclosure. For purposes of illustration, controller 300 is described herein within the context of interconnection system 2 of FIGS. 1 and 2, and may represent SDN controller 12. The architecture of controller 300 illustrated in FIG. 3 is shown for example purposes only and should not be limited to this architecture. In other examples, controller 300 may be configured in a variety of ways.

Controller 300 includes a control unit 302 coupled to a network interface 304 to exchange information with other devices by inbound link 306 and outbound link 308. Control unit 302 may include one or more processors (not shown) that execute software instructions, such as those used to define a software or computer program, stored to a computer-readable storage medium (not shown). Alternatively, or additionally, control unit 302 may comprise dedicated hardware for performing the techniques described herein.

Control unit 302 provides an operating environment for hybrid chromatic dispersion compensation unit 312. In one example, the hybrid chromatic dispersion compensation engine 312 may be implemented as one or more processes executed on one or more virtual machines of one or more servers. That is, while generally illustrated and described as executing on a single controller device 300, aspects of the hybrid chromatic dispersion compensation unit 312 may be delegated to other computing devices.

In the example of FIG. 3, an administrator may specify (e.g., via application(s) 15 that communicates with PNP 3 of FIG. 1) a request for the network infrastructure to provide a hybrid compensation of chromatic dispersion service. The administrator may also specify a threshold (e.g., chromatic dispersion (CD) threshold 315) that controls whether to apply the hybrid chromatic dispersion compensation service. For example, the administrator may specify a chromatic dispersion value or range for the threshold. As one example, the administrator may set the CD threshold 315 to any edge chromatic dispersion value or range (e.g., CD threshold 502A of FIG. 5).

PNP 3 may send instructions and/or requests to controller 300 to cause the evaluation unit 314 to be configured to evaluate whether to provide the requested hybrid compensation of chromatic dispersion service, such as configuring CD threshold 315 with the chromatic dispersion value or range specified by the administrator.

Evaluation unit 314 may determine whether to provide the requested hybrid compensation of chromatic dispersion service. For example, controller 300 may receive a chromatic dispersion value of an optical received at a coherent receiver (e.g., coherent receiver 5B of FIG. 2) via network interface 304. Controller 300 may implement gRPC, REST API, NETCONF, or other mechanisms to obtain chromatic dispersion values from coherent receivers. Evaluation unit 314 may compare a chromatic dispersion value with CD threshold 315. In response to determining that the chromatic dispersion value of the optical signal satisfies CD threshold 315 (e.g., exceeds the threshold, is within the threshold range, etc.), evaluation unit 314 may instruct DCM configuration unit 316 and/or phase response adjuster unit 318 to configure network devices within optical switch fabric 10 to compensate for the chromatic dispersion. In some examples, the administrator may specify whether to use one or more pre-provisioned DCMs in the optical path, an FIR filter of the coherent transmitter, or both the DCMs and FIR filter of the coherent transmitter to provide the compensation of chromatic dispersion as described in this disclosure. For example, the administrator may specify whether to provide a coarse grain compensation (e.g., using one or more DCMs), a fine grain compensation (e.g., using the FIR filter of the coherent transmitter), or both coarse grain and fine grain compensation.

DCM configuration unit 316 may cause controller 300 to send configuration information via network interface 304 to one or more switches, respectively (e.g., switches 202 of FIG. 2) to configure the one or more switches with a "cross" state to switch the optical signal to the DCM. DCM configuration unit 316 may alternatively, or additionally, cause controller 300 to send configuration information via network interface 304 to the one or more switches with a "bar" state to switch the optical signal to bypass the DCM.

Phase response adjuster unit 318 may cause controller 300 to send configuration information via network interface 304 to a coherent transmitter (e.g., coherent transmitter 5A of FIG. 2) to adjust a phase response (e.g., adjusting phase coefficients or "taps") of a Finite Impulse Response (FIR) filter to adjust the chromatic dispersion of the optical signal transmitted on the optical path. The adjustment of the phase response of the FIR filter may introduce a negative chromatic dispersion such that the coherent receiver (e.g., coherent receiver 5B of FIG. 2) receives an optical signal with a lower chromatic dispersion value, which does not cause DSP 204B of coherent receiver 5B to use a larger number of data points to correct the chromatic dispersion of the optical signal, and thus consumes less power when compensating the chromatic dispersion of the optical signal.

Figure 4:
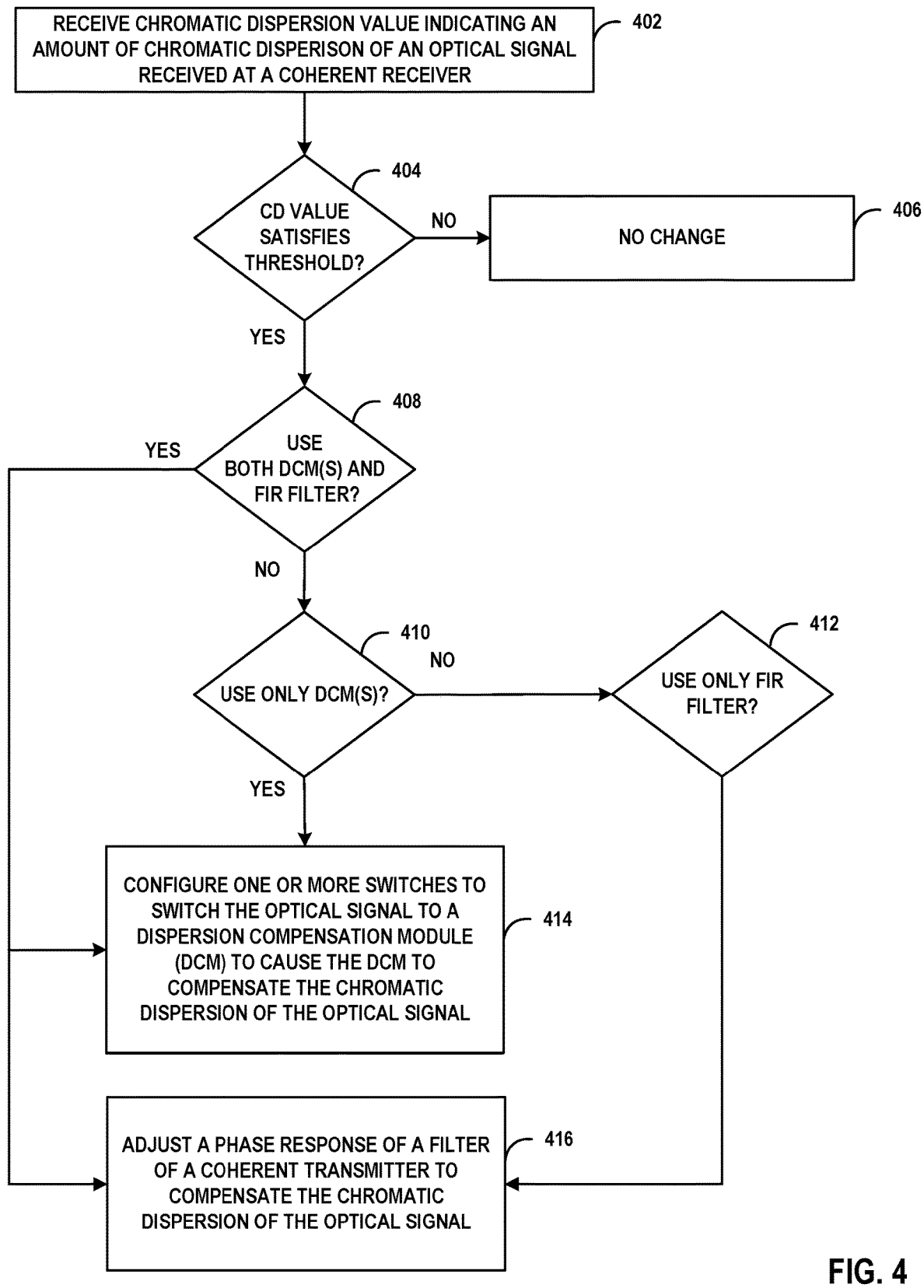
FIG. 4 is a flowchart illustrating example mode of operation for providing a hybrid compensation of chromatic dispersion in optical networks to reduce power consumption by coherent receivers, in accordance with one or more techniques described in this disclosure.

FIG. 4 is a flowchart illustrating example mode of operation of a controller for providing hybrid compensation of chromatic dispersion to reduce power consumption by coherent receivers, in accordance with the techniques described in this disclosure. FIG. 4 is described with reference to SDN controller 12 of FIGS. 1 and 2, but is applicable to any computing device of interconnection systems described in this disclosure.

In the example of FIG. 4, SDN controller 12 receives a chromatic dispersion value indicating an amount of chromatic dispersion of an optical signal received at a coherent receiver (402). For example, DSP 204B of coherent receiver 5B may initially compensate the chromatic dispersion of the received optical signal and determine the chromatic dispersion value of the optical signal. Coherent receiver 5B may send the chromatic dispersion value of the optical signal to SDN controller 12 or SDN controller 12 may obtain the chromatic dispersion value from receiver coherent receiver 5B.

SDN controller 12 determines whether to apply the hybrid compensation of chromatic dispersion to reduce power consumption by coherent receivers. For example, the evaluation unit 314 of SDN controller 12 may compare the chromatic dispersion value of the optical signal received at the receiver coherent receiver 5B with a chromatic dispersion threshold 315 (404). As one example, the threshold may be set to an edge chromatic dispersion value or range at which DSP 204B of coherent receiver 5B changes a number of data points in a Fast Fourier Transform used to compensate the chromatic dispersion. For instance, the threshold may specify a chromatic dispersion value greater than 8 ns/nm (or a chromatic dispersion range between 8 ns/nm to 10 ns/nm) that corresponds to the use of 2048 data points for an FFT or IFFT to compensate the chromatic dispersion, a chromatic dispersion value greater than 16 ns/nm (or a chromatic dispersion range between 16 ns/nm to 18 ns/nm) that corresponds to the use of 4096 data points for an FFT or IFFT to compensate the chromatic dispersion, or the like. If SDN controller 12 receives a chromatic dispersion value of 7 ns/nm from the coherent receiver, the power consumption evaluation unit 314 of SDN controller 12 may determine that chromatic dispersion value is not greater than the threshold ("NO" of step 404) and leaves the system unchanged (406).

If SDN controller 12 receives a chromatic dispersion value of 10 ns/nm of the optical signal received at the coherent receiver, the evaluation unit 314 of SDN controller 12 may determine that chromatic dispersion value satisfies the threshold ("YES" of step 404), and proceeds with the next step to determine the method to provide hybrid compensation. For example, in response to determining the chromatic dispersion value satisfies the threshold ("YES" of step 404), the SDN controller 12 determines whether the administrator specified whether to use one or more pre-provisioned DCMs in the optical path (410), an FIR filter of the coherent transmitter (412), or both the DCMs and FIR filter of the coherent transmitter (408) to provide the compensation of chromatic dispersion as described in this disclosure. For example, an administrator may specify whether to provide chromatic dispersion compensation via coarse chromatic dispersion compensation (e.g., using one or more DCMs in the optical path), fine tuning of chromatic dispersion (e.g., using FIR filter of the coherent transmitter), or both coarse and fine grained chromatic dispersion compensation.

If an administrator specifies the use of both DCMs and the FIR filter of the coherent transmitter to compensate chromatic dispersion of the optical signal ("YES" of step 408), SDN controller 12 configures one or more switches to switch an optical signal to the DCM to cause the DCM to compensate the chromatic dispersion of the optical signal (414) and adjusts a phase response of a filter (e.g., FIR filter) of a transmitter coherent transmitter 5A to compensate the chromatic dispersion of the optical signal (416). In some examples, if an administrator specifies the use of DCMs to compensate chromatic dispersion of the optical signal but does not specify the use of the FIR filter of the transmitter coherent transmitter 5A ("NO" of step 408 and "YES" of step 410), SDN controller 12 configures the one or more switches to switch an optical signal to the DCM to cause the DCM to compensate the chromatic dispersion of the optical signal (414). If the administrator specifies the use of the FIR filter of the coherent transmitter but does not specify the use of the DCMs to compensate the chromatic dispersion ("NO" of step 408, "NO" of step 410, and "YES" of step 412), SDN controller 12 configures the FIR filter by adjusting a phase response of the FIR filter of transmitter coherent transmitter 5A to compensate the chromatic dispersion of the optical signal.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   receiving, by a controller, a chromatic dispersion value indicating an amount of chromatic dispersion of an optical signal received at a coherent receiver integrated with a receiver optical network device;
   comparing, by the controller, the chromatic dispersion value with a threshold, wherein the threshold defines an edge chromatic dispersion value at which the coherent receiver changes, according to a step function, a number of data points in a function used to compensate the chromatic dispersion; and
   in response to determining that the chromatic dispersion value satisfies the threshold, performing at least one of:
   configuring a switch to switch the optical signal to a dispersion compensation module (DCM) to cause the DCM to compensate the chromatic dispersion of the optical signal, or
   adjusting a phase response of a filter of a coherent transmitter to compensate the chromatic dispersion of the optical signal.

2. The method of claim 1, wherein the DCM is included in an optical amplifier along an optical path.

3. The method of claim 1, wherein the function comprises a Fast Fourier Transform (FFT) used to compensate the chromatic dispersion.

4. The method of claim 1,
   in response to determining that the chromatic dispersion value no longer satisfies the threshold, configuring the switch to switch the optical signal to bypass the DCM.

5. The method of claim 1, wherein the switch comprises a first switch, wherein the DCM comprises a first DCM, the method further comprising:
   in response to determining that the chromatic dispersion value satisfies the threshold, configuring a second switch to switch the optical signal to a second DCM to cause the second DCM to compensate the chromatic dispersion of the optical signal.

6. The method of claim 1, wherein the switch comprises a first input and output pair to switch the optical signal to the DCM and a second input and output pair to switch the optical signal to bypass the DCM.

7. The method of claim 1, wherein the chromatic dispersion value comprises a first chromatic dispersion value, the method further comprising:
   receiving, by the coherent receiver, the optical signal with a second chromatic dispersion value that is less than the first chromatic dispersion value; and
   compensating, by the coherent receiver, the chromatic dispersion of the optical signal.

8. The method of claim 1, wherein in response to determining that the chromatic dispersion value satisfies the threshold, the performing comprises:
   configuring the switch to switch the optical signal to the DCM to cause the DCM to compensate the chromatic dispersion of the optical signal.

9. The method of claim 1, wherein in response to determining that the chromatic dispersion value satisfies the threshold, the performing comprises:
   adjusting the phase response of the filter of the coherent transmitter to compensate the chromatic dispersion of the optical signal.

10. The method of claim 1, wherein in response to determining that the chromatic dispersion value satisfies the threshold, the performing comprises:
   configuring the switch to switch the optical signal to the DCM to cause the DCM to compensate the chromatic dispersion of the optical signal; and
   adjusting the phase response of the filter of the coherent transmitter to compensate the chromatic dispersion of the optical signal.

11. A controller comprising:
   a memory; and
   one or more processors operably coupled to the memory, wherein the one or more processors are configured to:
   receive a chromatic dispersion value indicating an amount of chromatic dispersion of an optical signal received at a coherent receiver integrated with a receiver optical network device;
   compare the chromatic dispersion value with a threshold, wherein the threshold defines an edge chromatic dispersion value at which the coherent receiver changes, according to a step function, a number of data points in a function used to compensate the chromatic dispersion; and
   in response to determining that the chromatic dispersion value satisfies the threshold, perform at least one of:
   configure a switch to switch the optical signal to a dispersion compensation module (DCM) to cause the DCM to compensate the chromatic dispersion value of the optical signal, or
   adjust a phase response of a filter of a coherent transmitter to compensate the chromatic dispersion of the optical signal.

12. The controller of claim 11, wherein the DCM is included in an optical amplifier along an optical path.

13. The controller of claim 11, wherein the function comprises a Fast Fourier Transform (FFT) used to compensate the chromatic dispersion.

14. The controller of claim 11, wherein the one or more processors are further configured to:
   in response to determining that the chromatic dispersion value no longer satisfies the threshold, configure the switch to switch the optical signal to bypass the DCM.

15. The controller of claim 11, wherein the switch comprises a first switch, wherein the DCM comprises a first DCM, the one or more processors are further configured to:
   in response to determining that the chromatic dispersion value satisfies the threshold, configure a second switch to switch the optical signal to a second DCM to cause the second DCM to compensate the chromatic dispersion of the optical signal.

16. An interconnection system comprising:
   a coherent receiver integrated with a receiver optical network device;
   a coherent transmitter; and
   a controller,
   wherein the coherent receiver is configured to:
   receive an optical signal;
   determine a chromatic dispersion value indicating an amount of chromatic dispersion of the optical signal;
   send, to the controller, the chromatic dispersion value of the optical signal;
   wherein the controller is configured to:
   receive the chromatic dispersion value of the optical signal from the coherent receiver;
   compare the chromatic dispersion value with a threshold, wherein the threshold defines an edge chromatic dispersion value at which the coherent receiver changes, according to a step function, a number of data points in a function used to compensate the chromatic dispersion; and
   in response to determining that the chromatic dispersion value satisfies the threshold, perform at least one of:
   configure a switch to switch the optical signal to a dispersion compensation module (DCM) to cause the DCM to compensate the chromatic dispersion of the optical signal, or
   adjust a phase response of a filter of the coherent transmitter to compensate the chromatic dispersion of the optical signal.

17. The interconnection system of claim 16, wherein the coherent transmitter is configured to:
   receive, from the controller, the adjusted phase response of the filter;
   adjust the phase response of the filter; and
   apply, by the coherent transmitter, the filter with the adjusted phase response to the optical signal.

18. The interconnection system of claim 16, wherein the function comprises a Fast Fourier Transform (FFT) to compensate the chromatic dispersion.

19. The interconnection system of claim 16, wherein the controller is further configured to:
   in response to determining that the chromatic dispersion value no longer satisfies the threshold, configure the switch to switch the optical signal to bypass the DCM.

20. The interconnection system of claim 16, wherein the switch comprises a first switch, wherein the DCM comprises a first DCM, the controller is further configured to:
   in response to determining that the chromatic dispersion value satisfies the threshold, configure a second switch connected to a second DCM with a state to provide access to the second DCM to compensate the chromatic dispersion value of the optical signal.

\* \* \* \* \*